(12) United States Patent
Walton et al.

(10) Patent No.: US 11,280,183 B2
(45) Date of Patent: Mar. 22, 2022

(54) ADAPTIVE SIGNAL DETECTION FOR COMMUNICATING WITH DOWNHOLE TOOLS

(71) Applicant: HALLIBURTON ENERGY SERVICES, INC., Houston, TX (US)

(72) Inventors: Zachary William Walton, Carrollton, TX (US); Donald G. Kyle, Houston, TX (US); Matthew James Merron, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/315,128

(22) PCT Filed: Sep. 7, 2016

(86) PCT No.: PCT/US2016/050507
§ 371 (c)(1),
(2) Date: Jan. 3, 2019

(87) PCT Pub. No.: WO2018/048392
PCT Pub. Date: Mar. 15, 2018

(65) Prior Publication Data
US 2019/0309622 A1    Oct. 10, 2019

(51) Int. Cl.
*E21B 47/18* (2012.01)
*E21B 44/00* (2006.01)
(Continued)

(52) U.S. Cl.
CPC ............ *E21B 47/18* (2013.01); *E21B 44/005* (2013.01); *E21B 47/092* (2020.05);
(Continued)

(58) Field of Classification Search
CPC .... E21B 47/18; E21B 44/005; E21B 47/0905; E21B 47/091; E21B 47/12; E21B 47/14; G06F 17/11
See application file for complete search history.

(56) References Cited

U.S. PATENT DOCUMENTS 3,900,824 A * 8/1975 Trouiller ................... G01V 1/44
                                                    367/34
4,042,907 A * 8/1977 Trouiller ................... G01V 1/36
                                                    367/26
(Continued)

OTHER PUBLICATIONS

Office Action in CA Application No. 3,031,057, dated Nov. 27, 2019.
(Continued)

*Primary Examiner* — Nay Tun
(74) *Attorney, Agent, or Firm* — McGuireWoods LLP (57) ABSTRACT

Communication from a well surface location at a well site to a downhole tool positioned within a wellbore may be performed such that fluid flow is not restricted through the downhole tool. For example, a method may include: sending a signal from an uphole location to a downhole tool located in a wellbore, wherein the signal comprises at least one event selected from the group consisting of a magnetic wellbore projectile, an acoustic pulse, and a pressure change; taking measurements with a sensor coupled to the downhole tool, wherein the sensor is at least one selected from the group consisting of a magnetic sensor, an acoustic sensor, and a pressure sensor; identifying the signal based on at least one of the measurements greater than an adaptive threshold value; and actuating the downhole tool from a first configuration to a second configuration upon identification of the signal.

21 Claims, 4 Drawing Sheets

(51) Int. Cl.
*G06F 17/11* (2006.01)
*E21B 47/14* (2006.01)
*E21B 47/12* (2012.01)
*E21B 47/092* (2012.01)
*E21B 47/095* (2012.01)

(52) U.S. Cl.
CPC ............ *E21B 47/095* (2020.05); *E21B 47/12* (2013.01); *E21B 47/14* (2013.01); *G06F 17/11* (2013.01)

(56) References Cited

U.S. PATENT DOCUMENTS

| | | | | |
|---|---|---|---|---|
| 4,346,460 | A * | 8/1982 | Schuster | G01V 1/44 181/102 |
| 6,384,738 | B1 | 5/2002 | Carstensen et al. | |
| 8,616,276 | B2 * | 12/2013 | Tips | E21B 33/128 166/120 |
| 8,636,062 | B2 | 1/2014 | Fripp et al. | |
| 8,646,537 | B2 | 2/2014 | Tips et al. | |
| 9,010,442 | B2 | 4/2015 | Streich et al. | |
| 9,684,087 | B2 * | 6/2017 | Yang | G01N 29/32 |
| 2004/0163807 | A1 * | 8/2004 | Vercaemer | E21B 47/005 166/250.12 |
| 2006/0272859 | A1 * | 12/2006 | Pastusek | E21B 21/08 175/40 |
| 2007/0007016 | A1 * | 1/2007 | Sanderlin | E21B 47/00 166/381 |
| 2011/0079386 | A1 | 4/2011 | Fripp et al. | |
| 2011/0139445 | A1 | 6/2011 | Fripp et al. | |
| 2011/0153217 | A1 * | 6/2011 | Rodney | E21B 47/007 702/9 |
| 2012/0228028 | A1 * | 9/2012 | Turner | E21B 44/00 175/56 |
| 2013/0014959 | A1 | 1/2013 | Tips et al. | |
| 2013/0248247 | A1 | 9/2013 | Sugiura | |
| 2014/0083689 | A1 | 3/2014 | Streich et al. | |
| 2014/0197307 | A1 * | 7/2014 | Jorion | G01T 1/17 250/252.1 |
| 2015/0021021 | A1 | 1/2015 | Merron et al. | |
| 2015/0068771 | A1 * | 3/2015 | Richards | E21B 47/092 166/386 |
| 2015/0142320 | A1 * | 5/2015 | Wu | G01V 3/18 702/11 |
| 2015/0338537 | A1 * | 11/2015 | Khadhraoui | G01V 1/288 702/17 |
| 2016/0230505 | A1 | 8/2016 | Garcia et al. | |
| 2017/0212274 | A1 * | 7/2017 | Sun | G01V 1/284 |

OTHER PUBLICATIONS

Search Report dated May 15, 2019 in corresponding French Patent Application No. FR1756856.
Patent Cooperation Treaty, International Search Report and Written Opinion, PCT Appln. No. PCT/US2016/050507, dated May 18, 2017.
Search Report in DK Application No. PA 2019 00019, dated Feb. 17, 2020.

* cited by examiner

ADAPTIVE SIGNAL DETECTION FOR COMMUNICATING WITH DOWNHOLE TOOLS

BACKGROUND

The present disclosure relates to communicating between a well surface location at a well site and a downhole tool positioned within a wellbore.

In various subterranean operations, downhole tool strings are located within a casing, liner or production tubing to perform desired operations. Such a tool string may incorporate a variety of tools including, for example, sliding sleeves, circulating subs, packers, and the like. Once the tool string is properly positioned downhole, actuation of one or more of the downhole tools in the tool string may be desired. One method to communicate with and cause actuation of downhole tools involves deployment of a wellbore projectile, such as a ball, from the well surface location and operable to travel down the tool string and engage a ball seat within the downhole tool or an associated setting tool. The ball forms a seal with the seat such that increasing the tubing pressure applies an axial force to the seated ball, which causes a portion of the downhole tool to physically move from one configuration to another. In such methods, the ball must be removed from the seat to return fluid flow through the now-actuated downhole tool. The ball can be removed either by reverse circulating the ball back to the surface location or by allowing the ball to physically dissolve or degrade. As will be appreciated, this can increase the amount of time required to complete a downhole tool actuation operation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to communicating between a well surface location at a well site and a downhole tool positioned within a wellbore. More specifically, the methods and systems described herein use communication methods that do not restrict fluid flow through downhole tools, which allows for shorter actuation operations. Such communication methods may incorporate the use of magnetic sensors, acoustic sensors, and pressure sensors included on the downhole tool to receive a signal from an uphole location (e.g., from the well surface location) that causes the downhole tool to actuate. Such signals from the uphole location to the downhole tool may be achieved with magnetic wellbore projectiles, acoustic pulses, and pressure changes, respectively. The present disclosure further relates to adaptive signal detection to more accurately detect each of the magnetic wellbore projectiles, acoustic pulses, and pressure changes over background noise detected downhole.

As used herein, the term "wellbore projectile" is used to generally describe flowable devices/compositions, which may or may not be spherical, that are suitable for actuating downhole tools. The term "wellbore projectile," unless otherwise specific, encompasses any flowable device/composition that include, but are not limited to, balls, darts, plugs, fluids, and gels. As used herein, the term "magnetic wellbore projectile" refers to any flowable device/composition that has magnetic properties that can be sensed by a magnetic sensor. The magnetic wellbore projectile may itself be magnetic. Alternatively, the magnetic wellbore projectile may be capable of disrupting a magnetic field without itself being magnetic. By way of nonlimiting example, a ferromagnetic fluid or a magnetorheological fluid may be pumped to or past a magnetic sensor as part of the downhole tool actuation method and, therefore, may be considered or otherwise characterized as a magnetic wellbore projectile.

Figure 1:
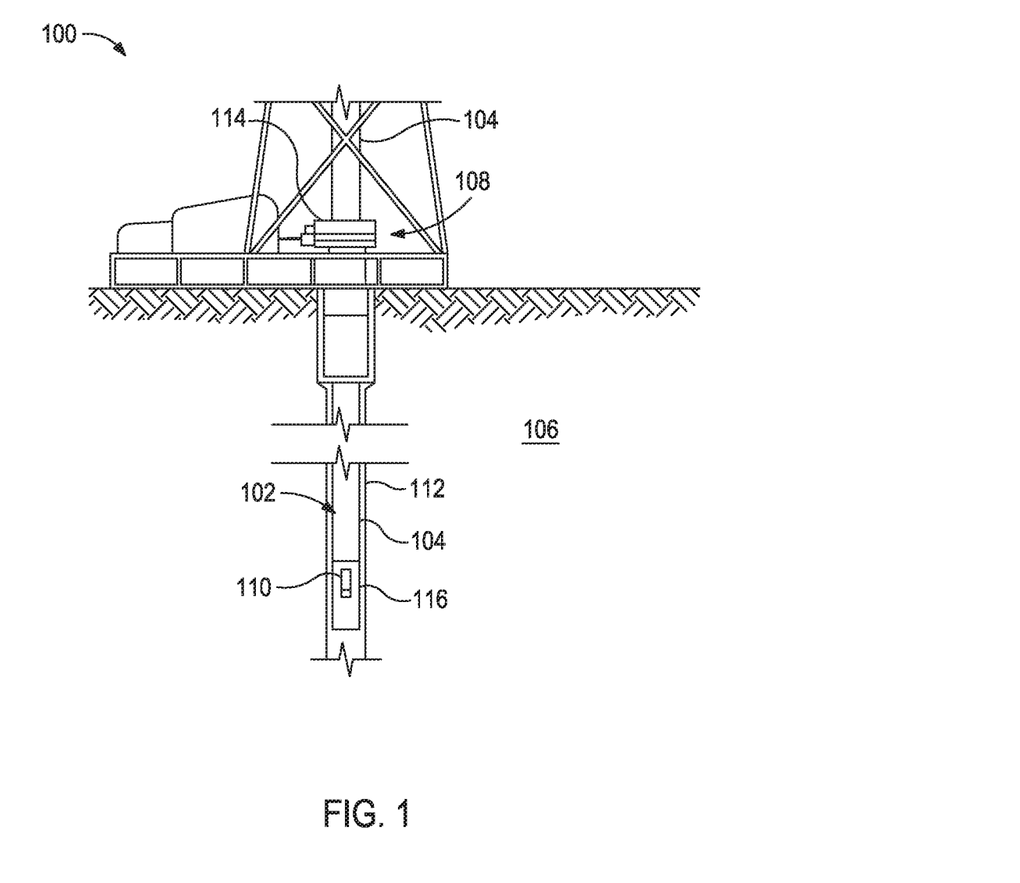
FIG. 1 is a schematic of an exemplary well system which can embody or otherwise employ one or more principles of the present disclosure.

FIG. 1 illustrates a schematic diagram of an exemplary system 100 that may employ the principles of the present disclosure, according to one or more embodiments. The system 100 may include one or more downhole tools 102 located in a wellbore 112 (illustrated as an open hole wellbore without a casing) penetrating a subterranean formation 106 and coupled to a conveyance 104 and/or a tubular (e.g., illustrated as coiled tubing but, alternatively, may be a string of production tubing, a work string, casing, a liner, drill pipe, a drill string, a landing string, slickline, wireline, or the like). Exemplary downhole tools 102 may comprise, but are not limited to, sliding sleeves, circulating subs, packers, and the like.

The downhole tools 102 may include one or more sensors 110 (e.g., magnetic sensors, acoustic sensors, and pressure sensors) for receiving signals from an uphole location (e.g., the surface 108 conveyed via magnetic wellbore projectiles, acoustic pulses, pressure changes, or a combination thereof). The sensors 110 may be communicably coupled to a controller 116 (e.g., that includes a processor as described further herein) for analyzing the measurements taken by the sensors 110 to identify the signals provided from the uphole location. Once the signals from the uphole location are identified, the controller 116 may then cause the downhole tool 102 to actuate.

As used herein, the term "signal from an uphole location" and derivations thereof encompass signals that are composed of a single detection, multiple detections, or a pattern of detections. For example, when communicating with magnetic wellbore projectiles, the signal may comprise the detection of a single magnetic wellbore projectile, the detection of two or more wellbore projectiles (e.g., the detection of 5 magnetic wellbore projectiles), or the detection of two or more magnetic wellbore projectiles in a specific pattern (e.g., the detection of 3 wellbore projectiles where the detection of each is less than 1 minute apart).

In some instances, the sensors 110 may comprise one or more magnetic sensors and one or more magnetic wellbore projectiles may be introduced into the wellbore 112 at a wellhead 114, conveyed toward the downhole tool 102, and interact with the magnetic sensor(s). The measurements (readings) from the magnetic sensor may then be analyzed by the controller 116 to identify the signal from the uphole location.

In some instances, the sensors 110 may comprise one or more acoustic sensors configured to detect an acoustic signal created in the wellbore 112. The acoustic signal can be created by axially and/or rotationally translating the conveyance 104 within the wellbore, and the resulting frictional engagement between the conveyance 104 and the wall of the wellbore generates acoustic noise. The acoustic signal may be created to replicate an acoustic signature recognizable by the sensor(s) 110, where the acoustic signature may comprise an acoustic signal generated at a predetermined frequency, by a predetermined pattern of acoustic signals, over a predetermined time period, or any combination thereof. The acoustic signal propagates through the conveyance 104 to be detected by the acoustic sensor. The measurements (readings) from the acoustic sensor may then be analyzed by the controller 116 to identify the acoustic signal from the uphole location, which causes the downhole tool 102 to actuate.

In some instances, the sensors 110 may comprise one or more pressure sensors configured to detect a pressure signal within the wellbore 112. The pressure signal may be created at the wellhead 114 (e.g., by changing the fluid flow rate) and detected by the pressure sensor(s). Similar to the acoustic signal, the pressure signal may be recognizable by the sensor(s) 110, where the pressure signal may comprise fluid pressure held at a predetermined level for a predetermined time period, a known pressure fluctuation, a predetermined pattern of pressure fluctuations, or any combination thereof. The pressure signal propagates though fluid within the wellbore 112 and is detected by the pressure sensor(s). The measurements (readings) from the pressure sensor(s) may then be analyzed by the controller 116 to identify the pressure signal from the uphole location, which causes the downhole tool 102 to actuate.

In some instances, the sensors 110 may comprise a combination of two or more different types of sensors where magnetic wellbore projectiles, acoustic pulses, pressure changes, or a combination thereof may be used to cause actuation of the downhole tool 102. In some instances, two or more downhole tools may be included where each tool includes a different type of sensor, which allows for actuating each downhole tool independently by the methods described herein.

When multiple sensors 110 are employed, each sensor 110 may have a corresponding controller 116, all sensors 110 may be coupled to a single controller 116, or some configuration therebetween.

Generally, the controller 116 identifies measurements greater than a threshold value as the signal (or event thereof) from the uphole location. However, when using the sensors 110 described herein, the downhole conditions may cause the baseline of the measurements to change. That is, the sensors 110 are generally configured at ambient surface conditions or based on estimated downhole conditions. However, the downhole conditions are dynamic and may be different than estimated, which changes the baseline measurement of the sensor 110, which is the measurement value when the event (e.g., a magnetic wellbore projectile, an acoustic signal, or a pressure signal) associated with the signal is not present.

For example, the measurements by magnetic sensors may be affected by the magnetic components in the downhole tool 102 or a casing/tubular near the downhole tool, magnetic compositions in the subterranean formation, and the like. Additionally, the measurements by acoustic sensors may be affected by rig noise, flow noise, and other downhole noises that can occur during wellbore operations. The measurements obtained by the pressure sensors may be affected by the hydrostatic pressure associated with wellbore depth, fluid composition, fluid flow rates, etc. When unexpected fluid loss is occurring downhole, for instance, the fluid flow rate at the pressure sensor may be different from expected and could adversely affect the baseline measurement.

Additionally, for each type of sensor 110, vibrations downhole may shift the sensor 110 or a component thereof which may change the interaction between the sensor 110 and objects nearby and/or how the components of the sensor 110 interact and, consequently, the baseline measurement of the sensor 110. For example, in magnetic sensors, the distance between components may affect the strength of magnetic field, which may affect the baseline and the identification of the signal or event thereof (i.e., the strength of the interaction between the magnetic wellbore projectile and the magnetics field).

The baseline measurement may change, for example, by increasing over time, decreasing over time, or fluctuating up and down. To mitigate detecting false signals or events thereof and/or missing real signals or events thereof, adaptive signal detection methods may be employed by the controller 116 to produce an adaptive threshold value based on the changes to the baseline measurements.

The adaptive threshold value ($T_i$) may be based on (e.g., a function ($f$) of EQ. 1) the present baseline value ($B_i$), which itself is determined by a mathematical analysis of the measurements (m) of the sensor 110.

$$T_i = f(B_i) \qquad \text{EQ. 1}$$

The present baseline value ($B_i$) may be based on (e.g., a function (g) of EQ. 2) the present measurement ($m_i$) and one or more previous measurements ($m_{i-1}, \ldots, m_{i-n}$) (where n is the number of previous measurements).

$$B_i = g(m_i, m_{i-1}, \ldots, m_{i-n}) \qquad \text{EQ. 2}$$

By way of nonlimiting example, as described in EQ. 3, $f(B_i)$ may be a predetermined offset factor ($\alpha$) greater than the present baseline value ($B_i$).

$$f(B_i) = \alpha + B_i \qquad \text{EQ. 3}$$

By way of nonlimiting example, as described in EQ. 4, $f(B_i)$ may be a predetermined shift factor ($\beta$) times greater than the present baseline value ($B_i$).

$$f(B_i) = \beta * B_i \qquad \text{EQ. 4}$$

In another example, the threshold value ($T_i$) additionally depends on previous calculations of the threshold.

$$T_i = f(B_i) + h(T_{i-1}, T_{i-2}, \ldots, T_{i-n}) \qquad \text{EQ. 5}$$

It should be evident, that both an offset factor and a shift factor could be used simultaneously.

The shift factor $\beta$, the offset factor $\alpha$, and the functions, $f$, $g$, or $h$, may have a different value depending on whether the adaptive threshold value $T_i$ is greater than or less than the measured value $m_i$. For example, allowing different values for the factors can allow for faster adaptation when the measurements are exceeding the threshold and slower adaptation when the measurements are not exceeding the threshold. Allowing different adaptation rates can be advantageous for reducing noise sensitivity.

For example, when $m_i > T_i$, the controller 116 identifies the measurement as a signal or event thereof from the uphole location. After the signal has been identified by the controller 116, the controller 116 causes the downhole tool 110 to actuate.

In some embodiments, the measurements $m_i$ may be raw measurements from the sensor 110. Alternatively, the controller 116 or other electronic circuitry may apply a filter to the measurements to attenuate the measurements. Exemplary filters may include, but are not limited to, low-pass filters, band-pass filters, absolute value calculation, and the like.

In some embodiments, there may be a delay between when the downhole tool 110 is introduced into the wellbore 112 and when the sensor 110 begins taking measurements and/or when the controller 116 begins analyzing the measurements (referred to herein collectively as activating the sensor 110 or a derivative thereof). This may allow the sensor 110 or components thereof to adjust to the downhole conditions (e.g., change temperature, move due to vibration, interact with objects nearby the sensor 110, conserve power, and the like). In some instances, activation of the sensor 110 may be delayed until the downhole tool 102 is placed in a desired location (or final location) within the wellbore 112. In some instances, activation of the sensor 110 may occur after the downhole tool 102 is in the wellbore 112 but before the downhole tool 102 is placed in a desired location (or final location) within the wellbore 112, for example, within the last 80% (by distance) of the trip downhole (i.e., after the downhole tool 102 has been conveyed 20% of the total trip distance). In some instances, activation of the sensor 110 or the controller 116 is delayed until a temperature change has been measured or until a threshold temperature has been passed.

Figure 2:
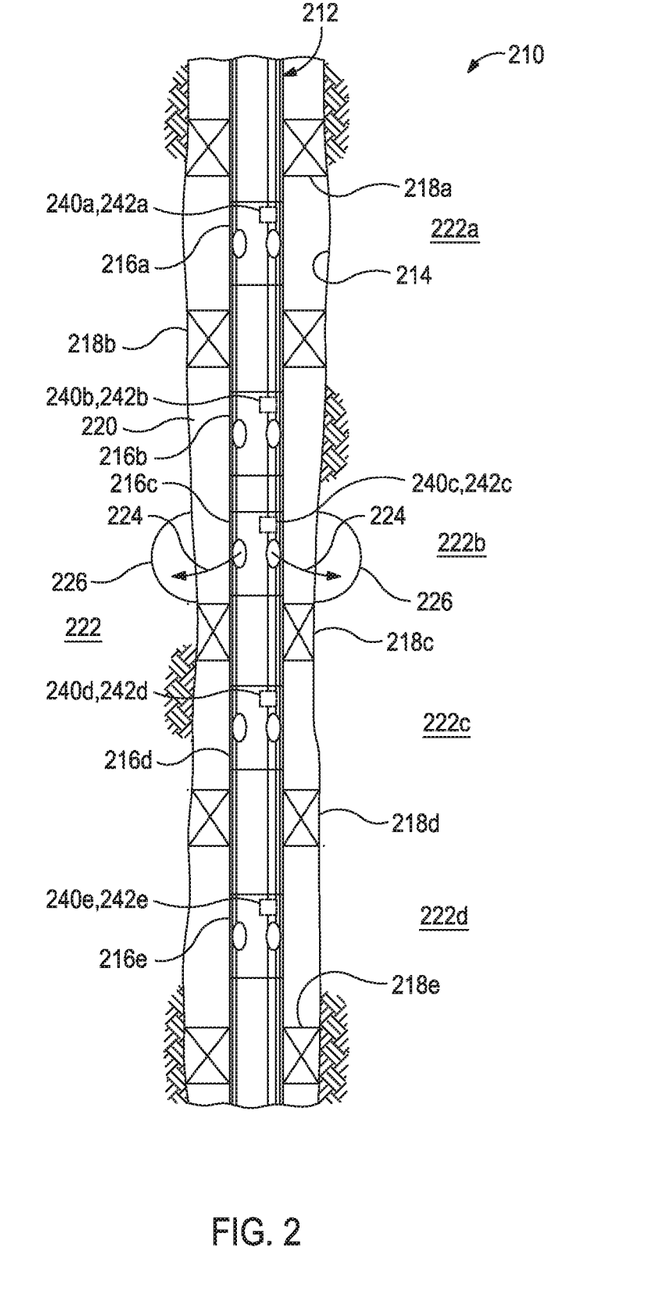
FIG. 2 illustrates an exemplary downhole tool for implementing the methods described herein for actuating the downhole tool or a portion/component thereof.

FIG. 2 illustrates an exemplary downhole tool 210 for use in a wellbore 214 when implementing the methods described herein for actuating the downhole tool 210 or a component thereof. More specifically, in the illustrated example, a tubular string 212 is positioned in a wellbore 214, with the tubular string 212 having multiple injection valves 216*a-e* and packers 218*a-e* interconnected therein.

The packers 218*a-e* seal off an annulus 220 formed radially between the tubular string 212 and the wellbore 214. The packers 218*a-e* in this example are designed for sealing engagement with an uncased or "open hole" wellbore 214, but if the wellbore is cased or lined, then cased hole-type packers may be used instead. Swellable, inflatable, expandable and other types of packers may be used, as appropriate for the well conditions, or no packers may be used (for example, the tubular string 212 could be expanded into contact with the wellbore 214, the tubular string could be cemented in the wellbore, etc.).

The injection valves 216*a-e* permit selective fluid communication between an interior of the tubular string 212 and each section of the annulus 220 isolated between two of the packers 218*a-e*. Each section of the annulus 220 is in fluid communication with a corresponding subterranean formation zone 222*a-d*. Of course, if packers 218*a-e* are not used, then the injection valves 216*a-e* can otherwise be placed in communication with the individual zones 222*a-d*, for example, with perforations, etc.

It is sometimes beneficial to initiate fractures 226 at multiple locations in a zone (for example, in tight shale formations, etc.), in which cases the multiple injection valves can provide for injecting fluid 224 at multiple fracture initiation points along the wellbore 214. In the example depicted in FIG. 2, the valve 216*c* has been opened, and fluid 224 is being injected into the zone 222*b*, thereby forming the fractures 226.

In some embodiments, the other valves 216*a,b,d,e* are closed while the fluid 224 is being flowed out of the valve 216*c* and into the zone 222*b*. This enables all of the fluid 224 flow to be directed toward forming the fractures 226, with enhanced control over the operation at that particular location. However, in other examples, multiple valves 216*a-e* could be open while the fluid 224 is flowed into a zone of an earth formation 222. In the downhole tool 210, for example, both of the valves 216*b,c* could be open while the fluid 224 is flowed into the zone 222*b*. This would enable fractures to be formed at multiple fracture initiation locations corresponding to the open valves.

Each of the valves 216*a-e* include corresponding sensors 240*a-e* and controllers 242*a-e*. Each of the sensors 240*a-e* may independently comprise one or more magnetic sensors, one or more acoustic sensors, one or more pressure sensors, or a combination thereof.

Exemplary magnetic sensors may include, but are not limited to, giant magneto-resistive (GMR) sensors, Hall-effect sensors, conductive coils, magneto-diodes, magneto-transistors, magnetometers, Lorentz force based microelectromechanical system (MEMS) sensors, magnetostrictive sensors, and the like.

Exemplary acoustic sensors may include, but are not limited to, Fiber Bragg Grating (FBG) sensors, hydrophones, accelerometers, piezoelectric materials, ferroelectric materials, strain transducers, and the like.

Exemplary pressure sensors may include, but are not limited to, pressure transducers, and the like.

Figure 3:
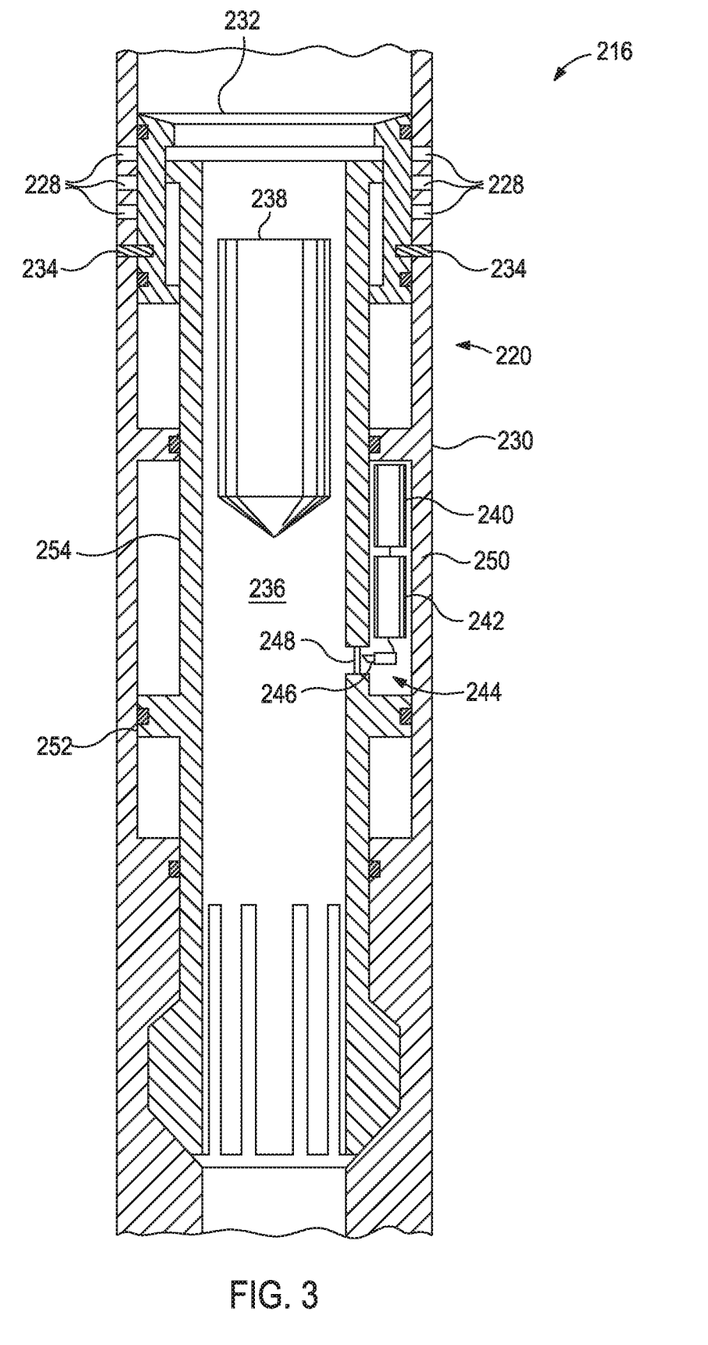
FIG. 3 is an enlarged scale cross-sectional view of one example of the injection valve of FIG. 2 that uses a magnetic sensor.

By way of nonlimiting example, FIG. 3 is an enlarged scale cross-sectional view of one example of an injection valve 216 that uses a magnetic sensor 240. In alternative embodiments, the magnetic sensor 240 may be replaced or supplemented with an acoustic sensor, a pressure sensor, or both.

The illustrated injection valve 216 is representatively illustrated in a closed position. The injection valve 216 of FIG. 3 may be used in the downhole tool 210 and corresponding methods, or it may be used in other well systems and methods, while remaining within the scope of this disclosure.

The valve 216 includes openings 228 in a sidewall of a generally tubular housing 230. The openings 228 are blocked by a sleeve 232, which is retained in position by shear members 234.

In this configuration, fluid communication is prevented between the annulus 220 external to the valve 216, and an internal flow passage 36 which extends longitudinally through the valve (and which extends longitudinally through the tubular string 212 (FIG. 2) when the valve is interconnected therein). The valve 216 can be opened, however, by shearing the shear members 234 and displacing the sleeve 232 (downward as viewed in FIG. 3) to a position in which the sleeve does not block the openings 228.

To open the valve 216, a magnetic wellbore projectile 238 (e.g., illustrated as a wellbore dart) is displaced into the valve to activate an actuator 250 thereof. The wellbore projectile 238 is depicted in FIG. 3 as being generally cylindrical, but other shapes and types of magnetic devices/compositions as described above may be used in other examples.

The wellbore projectile 238 may be displaced into the valve 216 by any technique. For example, the wellbore projectile 238 can be dropped through the tubular string 212 (FIG. 2), pumped by flowing fluid through the passage 236, self-propelled, conveyed by wireline, slickline, coiled tubing, or the like, and any combination thereof.

The wellbore projectile 238 has known magnetic properties or produces a known magnetic field that is detected by the magnetic sensor 240 of the valve 216. Exemplary materials that having known magnetic properties may include, but are not limited to, iron, nickel, cobalt, steel, magnetite, mu-metal (a nickel-iron soft magnetic alloy), and the like, or any combination thereof. Exemplary materials that produce a known magnetic field may include, but are not limited to, alnico, ferrite, neodymium magnets, samarium cobalt magnets, yttrium cobalt magnets, and the like, or any combination thereof.

The wellbore projectile 238 may comprise one or more of the foregoing materials. In some instances, the wellbore projectile 238 may comprise one or more of the foregoing materials dispersed or otherwise contained in a polymeric matrix (e.g., a polyurethane rubber, a polyester-based polyurethane rubber, a polyether-based polyurethane rubber, a thiol-based polymer, a thiol-epoxy polymer, a hyaluronic acid rubber, a polyhydroxobutyrate rubber, a polyester elastomer, a polyester amide elastomer, a starch-based resin, a polyethylene terephthalate polymer, a polyester thermoplastic, a polylactic acid polymer, a polybutylene succinate polymer, a polyhydroxy alkanoic acid polymer, a polybutylene terephthalate polymer, a polysaccharide, chitin, chitosan, a protein, an aliphatic polyester, poly($\varepsilon$-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride), a polyepichlorohydrin, a copolymer of ethylene oxide/polyepichlorohydrin, a terpolymer of epichlorohydrin/ethylene oxide/allyl glycidyl ether, any copolymer thereof, any terpolymer thereof, and any combination thereof.

Optionally, permanent magnets may be combined with the magnetic sensor 240 in order to create a magnetic field that is disturbed by the wellbore projectile 238 (or any other magnetic wellbore projectile). A change in the magnetic field can be detected by the magnetic sensor 240 as an indication of the presence of the wellbore projectile 238.

The magnetic sensor 240 is coupled to a controller 242 that determines whether the magnetic sensor 240 has detected the wellbore projectile 238 using an adaptive signal detection method described herein. The controller 242 could be supplied with electrical power via an on-board battery, a downhole power generator, or any other electrical power source.

Once the controller 242 determines that the magnetic sensor 240 has detected the wellbore projectile 238 or a predetermined number or pattern of the wellbore projectiles 238 (i.e., identifies the signal from the uphole location using an adaptive signal detection method described herein), the controller 242 causes a valve device 244 to open. In this example, the valve device 244 includes a piercing member 246, which pierces a pressure barrier 248. The piercing member 246 may be an electrical, hydraulic, mechanical, explosive, chemical, or other type of actuator. Other types of valve devices 244 (such as those described in U.S. Patent Application Publication Nos. 2011/0174504 and 2013/0048290 and U.S. Pat. No. 8,235,103) may be used, in keeping with the scope of this disclosure. When the valve device 244 of the present example is opened, a piston 252 on a mandrel 254 becomes unbalanced (e.g., a pressure differential is created across the piston 252), and the piston displaces downward as viewed in FIG. 3. This displacement of the piston 252 could, in some examples, be used to shear the shear members 234 and displace the sleeve 232 to an open position.

The controller 116,242 (of FIG. 1 or 2) and corresponding computer hardware used to implement the various illustrative blocks, modules, elements, components, methods, and algorithms described herein may be configured to execute one or more sequences of instructions, programming stances, or code stored on a non-transitory, computer-readable medium. The controller 116,242 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a controller 116,242 to perform the process steps described herein. One or more controller 116,242 in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a controller 116,242 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

For example, the controller 116,242 described herein may be configured for receiving inputs from the sensor 110 corresponding to the measurements made by the sensor 110. The controller 116,242 may also be configured to perform or reference mathematical analyses, calculations, lookup tables, and offset well data comparisons that are stored on the controller 116,242 to identify a signal from an uphole location. Further, the controller 116,242 may produce an output received by one or more components of the downhole tool 102 that causes the downhole tool 102 to actuate.

Embodiments disclosed herein include, but are not limited to, Embodiment A, Embodiment B, and Embodiment C.

Embodiment A is a method comprising: sending a signal from an uphole location to a downhole tool located in a wellbore, wherein the signal comprises at least one event selected from the group consisting of a magnetic wellbore projectile, an acoustic pulse, and a pressure change; taking measurements with a sensor coupled to the downhole tool, wherein the sensor is at least one selected from the group consisting of a magnetic sensor, an acoustic sensor, and a pressure sensor; identifying the signal based on at least one of the measurements greater than an adaptive threshold value; and actuating the downhole tool from a first configuration to a second configuration upon identification of the signal.

Embodiment B is a well system comprising: a downhole tool located in a wellbore and comprising a sensor coupled to a controller, the sensor being selected from the group consisting of a magnetic sensor, an acoustic sensor, and a pressure sensor, and the controller including a non-transitory, tangible, computer-readable storage medium containing a program of instructions that, when executed, cause the well system to perform a method comprising: Embodiment A.

Embodiment C is a non-transitory, tangible, computer-readable storage medium containing a program of instructions that, when executed, cause a well system to perform a method comprising: Embodiment A.

Embodiments A, B, and C may optionally include one or more of the following: Element 1: wherein the adaptive threshold value ($T_i$) is a function ($f$) of a present baseline value ($B_i$) for the measurements and the present baseline value ($B_i$) is a function (g) of a present measurement ($m_i$) and one or more previous measurements ($m_{i-1}, \ldots, m_{i-n}$), where n is a number of the one or more previous measurements, according to $T_i=f(B_i)=f(g(m_i, m_{i-1}, \ldots, m_{i-n}))$; Element 2: Element 1 and wherein $f(B_i)=\alpha+B_i$, where α is an offset factor; Element 3: Element 1 and wherein $f(B_i)=\beta*B_i$, where β is a shift factor; Element 4: wherein the adaptive threshold value ($T_i$) is a function ($f$) of a present baseline value ($B_i$) for the measurements and a function (h) of previous adaptive threshold values, according to $T_i=f(B_i)+h(T_{i-1}, T_{i-2}, \ldots, T_{i-n})$; Element 5: Element 4 and wherein $f(B_i)=\alpha+B_i$, where α is an offset factor; Element 6: Element 4 and wherein $f(B_i)=\beta*B_i$, where β is a shift factor; Element 7: the method further comprising delaying taking the measurements with the sensor until after the downhole tool is in the wellbore; Element 8: the method further comprising delaying taking the measurements with the sensor until after the downhole tool has been placed in a final location within the wellbore; and Element 9: wherein the signal comprises a plurality of the events in a pattern.

Exemplary combinations of Elements may include, but are not limited to: Elements 1-3 in combination and optionally in further combination with one or more of Elements 7-9; Elements 4-6 in combination and optionally in further combination with one or more of Elements 7-9; Elements 7 and 9 in combination and optionally in further combination with one or more of Elements 1-3; and Elements 8 and 9 in combination and optionally in further combination with one or more of Elements 1-3.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Figure 4:
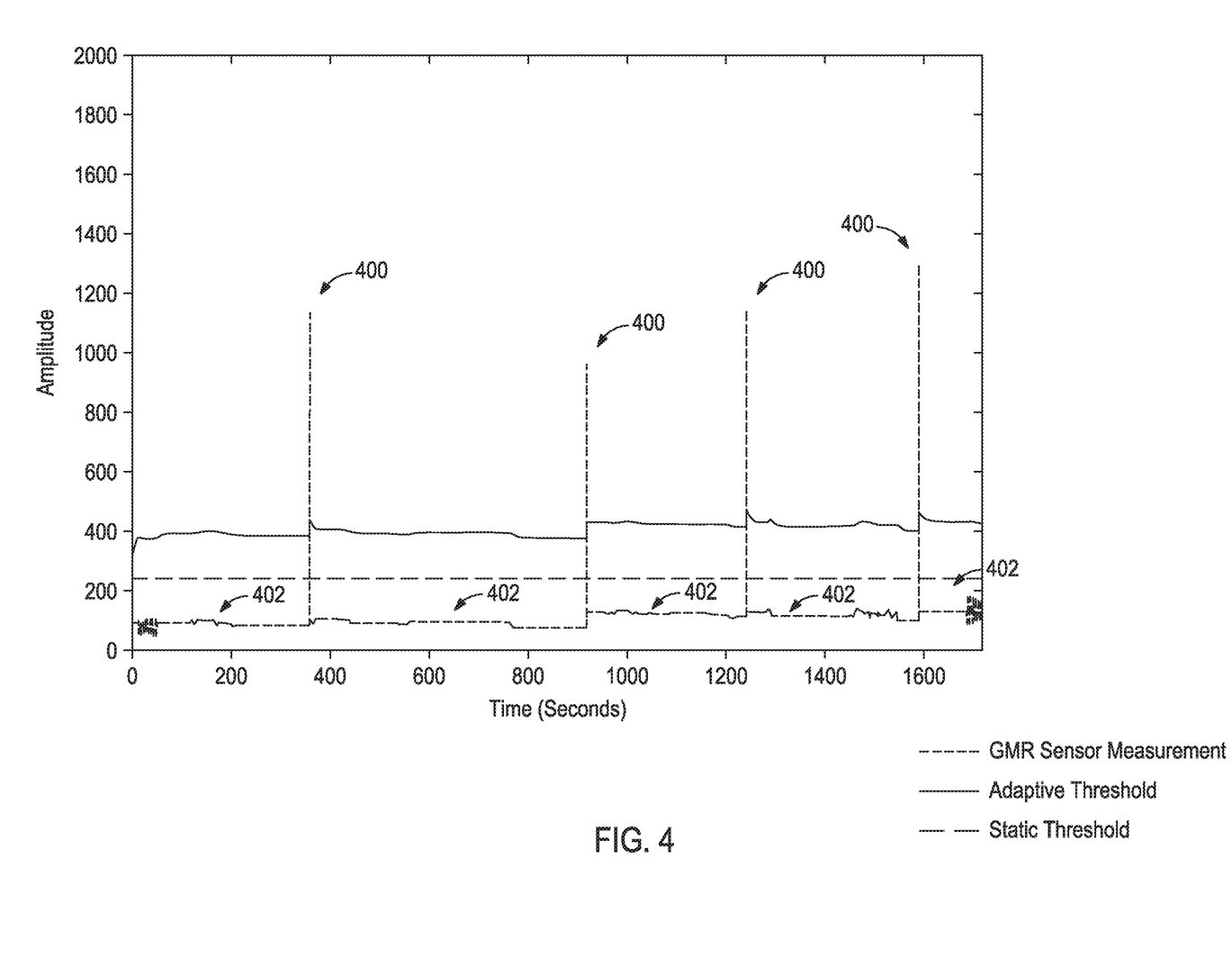
FIG. 4 is a plot of the measurements from a giant magneto-resistive sensor overlayed with a static threshold and an exemplary adaptive threshold of the present disclosure.

A sliding sleeve downhole tool with a GMR sensor was positioned in a wellbore. Multiple magnetic frac balls were dropped into the wellbore and detected by the GMR sensor. FIG. 4 is a plot of the measurements from the GMR sensor overlayed with a static threshold and an exemplary adaptive threshold of the present disclosure.

Over the entirety of the test, not just what is illustrated in FIG. 4, the background measurement 402 of the GMR sensor ranged from about 0 to about 300 (scaled measure of magnetic flux), and the measurement 400 of the magnetic frac balls ranged from about 800 to about 1700. Generally, the threshold is selected such that the measurement value of the event is 3 or more times greater than the threshold. However, with the magnetic frac ball yielding measurements as low as 800, a corresponding static threshold of about 250 would be within the GMR sensor background measurements and identify false positives, which may cause the downhole tool to actuate prematurely. For example, in FIG. 4, the background measurement 402 clearly increases over time. Depending on the length of time for the communication operation, the baseline may exceed the static threshold. By contrast, the adaptive threshold illustrated in FIG. 4 increases as the baseline increases to mitigate false positives.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   sending a signal from an uphole location to a downhole tool located in a wellbore, wherein the signal comprises at least one event associated with a magnetic wellbore projectile;
   taking measurements with a sensor coupled to the downhole tool, wherein the sensor is a magnetic sensor;
   identifying the signal based on at least one of the measurements greater than an adaptive threshold value to determine a presence of the magnetic wellbore projectile, wherein the adaptive threshold is a function of one or more baseline measurements of the magnetic sensor, and wherein a value of the adaptive threshold changes based on changes to one or more baseline measurements, and wherein the changes to the one or more baseline measurements are due to a downhole condition's magnetic effect on the magnetic sensor; and
   actuating the downhole tool from a first configuration to a second configuration upon identification of the signal.

2. The method of claim 1, wherein the adaptive threshold value ($T_i$) is a function ($f$) of a present baseline value ($B_i$) for the measurements and the present baseline value ($B_i$) is a function (g) of a present measurement ($m_i$) and one or more previous measurements ($m_{i-1}$, $m_{i-n}$), where n is a number of the one or more previous measurements, according to $T_i = f(B_i) = f(g(m_i, m_{i-1}, \ldots, m_{i-n}))$.

3. The method of claim 2, wherein $f(B_i) = \alpha + B_i$, where $\alpha$ is an offset factor.

4. The method of claim 2, wherein $f(B_i) = \beta * B_i$, where $\beta$ is a shift factor.

5. The method of claim 1, wherein the adaptive threshold value ($T_i$) is a function ($f$) of a present baseline value ($B_i$) for the measurements and a function (h) of previous adaptive threshold values, according to $T_i = f(B_i) + h(T_{i-1}, T_{i-2}, \ldots, T_{i-n})$, wherein each of $T_{i-1}, T_{i-2}, \ldots, T_{i-n}$ is a previous measurement, and wherein n is a number of previous measurements.

6. The method of claim 5, wherein $f(B_i) = \alpha + B_i$, where $\alpha$ is an offset factor.

7. The method of claim 5, wherein $f(B_i) = \beta * B_i$, where $\beta$ is a shift factor.

8. The method of claim 1 further comprising:
   delaying taking the measurements with the sensor until after the downhole tool is in the wellbore.

9. The method of claim 1 further comprising:
   delaying taking the measurements with the sensor until after the downhole tool has been placed in a final location within the wellbore.

10. The method of claim 1, wherein the signal comprises a plurality of the events in a pattern.

11. A well system comprising:
    a downhole tool located in a wellbore and comprising a sensor coupled to a controller, the sensor being a magnetic sensor, and the controller including a non-transitory, tangible, computer-readable storage medium containing a program of instructions that, when executed, cause the well system to perform a method comprising:
    sending a signal from an uphole location to the downhole tool located in the wellbore, wherein the signal is associated with a presence of a magnetic wellbore projectile;
    taking measurements with the sensor coupled to the downhole tool;
    identifying the signal based on at least one of the measurements greater than an adaptive threshold value to determine a presence of the magnetic wellbore projectile, wherein the adaptive threshold is a function of one or more baseline measurements of the magnetic sensor, and wherein a value of the adaptive threshold changes based on changes to one or more baseline measurements and wherein the changes to the one or more baseline measurements are due to a downhole condition's magnetic effect on the magnetic sensor; and
    actuating the downhole tool from a first configuration to a second configuration upon identification of the signal.

12. The well system of claim 11, wherein the adaptive threshold value ($T_i$) is a ($f$) a present baseline value ($B_i$) for the measurements and the present baseline value ($B_i$) is a function (g) of a present measurement ($m_i$) and one or more previous measurements ($m_{i-1}, \ldots, m_{i-n}$), where n is a number of the one or more previous measurements, according to $T_i = f(B_i) = f(g(m_i, m_{i-1}, \ldots, m_{i-n}))$.

13. The well system of claim 12, wherein $f(B_i) = \alpha + B_i$ where $\alpha$ is a predetermined factor.

14. The well system of claim 12, wherein n $f(B_i) = \beta * B_i$ where $\beta$ is a predetermined factor.

15. The well system of claim 11, wherein the adaptive threshold value ($T_i$) is a function ($f$) of a present baseline value ($B_i$) for the measurements and a function (h) of previous adaptive threshold values, according to $T_i = f(B_i) + h(T_{i-1}, T_{i-2}, \ldots, T_{i-n})$, wherein each of $T_{i-1}, T_{i-2}, \ldots, T_{i-n}$ is a previous measurement, and wherein n is a number of previous measurements.

16. The well system of claim 15, wherein $f(B_i) = \alpha + B_i$, where $\alpha$ is an offset factor.

17. The well system of claim 15, wherein $f(B_i) = \beta * B_i$, where $\beta$ is a shift factor.

18. The well system of claim 11, wherein the method further comprises:
    delaying taking the measurements with the sensor until after the downhole tool is in the wellbore.

19. The well system of claim 11, wherein the method further comprises:
    delaying taking the measurements with the sensor until after the downhole tool has been placed in a final location within the wellbore.

20. The well system of claim 11, wherein the magnetic wellbore projectile is a ferromagnetic fluid.

21. A non-transitory, tangible, computer-readable storage medium containing a program of instructions that, when executed, cause a well system to perform a method comprising:

sending a signal from an uphole location to a downhole tool located in a wellbore, wherein the signal is associated with a presence of a magnetic wellbore projectile;

taking measurements with a sensor coupled to the downhole tool, wherein the sensor is a magnetic sensor;

identifying the signal based on at least one of the measurements greater than an adaptive threshold value to determine a presence of the magnetic wellbore projectile, wherein the adaptive threshold is a function of one or more baseline measurements of the magnetic sensor, and wherein a value of the adaptive threshold changes based on changes to one or more baseline measurements, and wherein the changes to the one or more baseline measurements are due to a downhole condition's magnetic effect on the magnetic sensor; and actuating the downhole tool from a first configuration to a second configuration upon identification of the signal.

\* \* \* \* \*